US006429776B1

United States Patent
Alicot et al.

(10) Patent No.: US 6,429,776 B1
(45) Date of Patent: Aug. 6, 2002

(54) RFID READER WITH INTEGRATED DISPLAY FOR USE IN A PRODUCT TAG SYSTEM

(75) Inventors: Jorge Alicot, Davie; Terry L. Glatt, Pompano Beach, both of FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 09/778,415

(22) Filed: Feb. 7, 2001

(51) Int. Cl.$^7$ ............................................. G08B 13/14
(52) U.S. Cl. ................... 340/572.1; 340/572.4; 340/572.8; 340/572.9; 340/568.1; 340/10.52; 235/462.01; 235/462.05; 235/462.13; 235/901
(58) Field of Search .................. 340/572.1, 572.3, 340/572.4, 572.8, 572.9, 568.1, 551, 10.51, 10.52; 70/57.1, 416; 235/462.01, 462.05, 462.13, 900, 901

(56) References Cited

U.S. PATENT DOCUMENTS

| | | | | |
|---|---|---|---|---|
| 5,151,684 A | * | 9/1992 | Johnsen ................... 340/572.1 |
| 5,528,914 A | * | 6/1996 | Nguyen et al. ............... 70/57.1 |
| 5,535,606 A | * | 7/1996 | Nguyen et al. ............... 70/57.1 |
| 5,584,362 A | * | 12/1996 | Dumont ......................... 186/61 |
| 5,955,951 A | * | 9/1999 | Wischerop et al. ....... 340/572.8 |

* cited by examiner

Primary Examiner—Daniel J. Wu
Assistant Examiner—Toan Pham
(74) Attorney, Agent, or Firm—Rick F. Comoglio; Paul T. Kashimba

(57) ABSTRACT

A product tag system comprises: an RFID tag adapted for attachment to a product; a data store in the tag for bar code information relating to the product; a tag detacher for removing the tag from the product at a point of sale; an RFID tag reader for retrieving the bar code information from the tag when the tag is placed in the tag detacher; and, an display for presenting the bar code information in a form which can be scanned by a conventional bar code scanner, and/or in human readable form. A method for monitoring products comprise the steps of: attaching an RFID tag to a product; writing bar code information onto the tag; retrieving the bar code information from the tag at a point of sale; displaying the bar code information in a form which can be scanned by a conventional bar code scanner, and/or in human readable form; and, detaching the tag from the product.

29 Claims, 5 Drawing Sheets

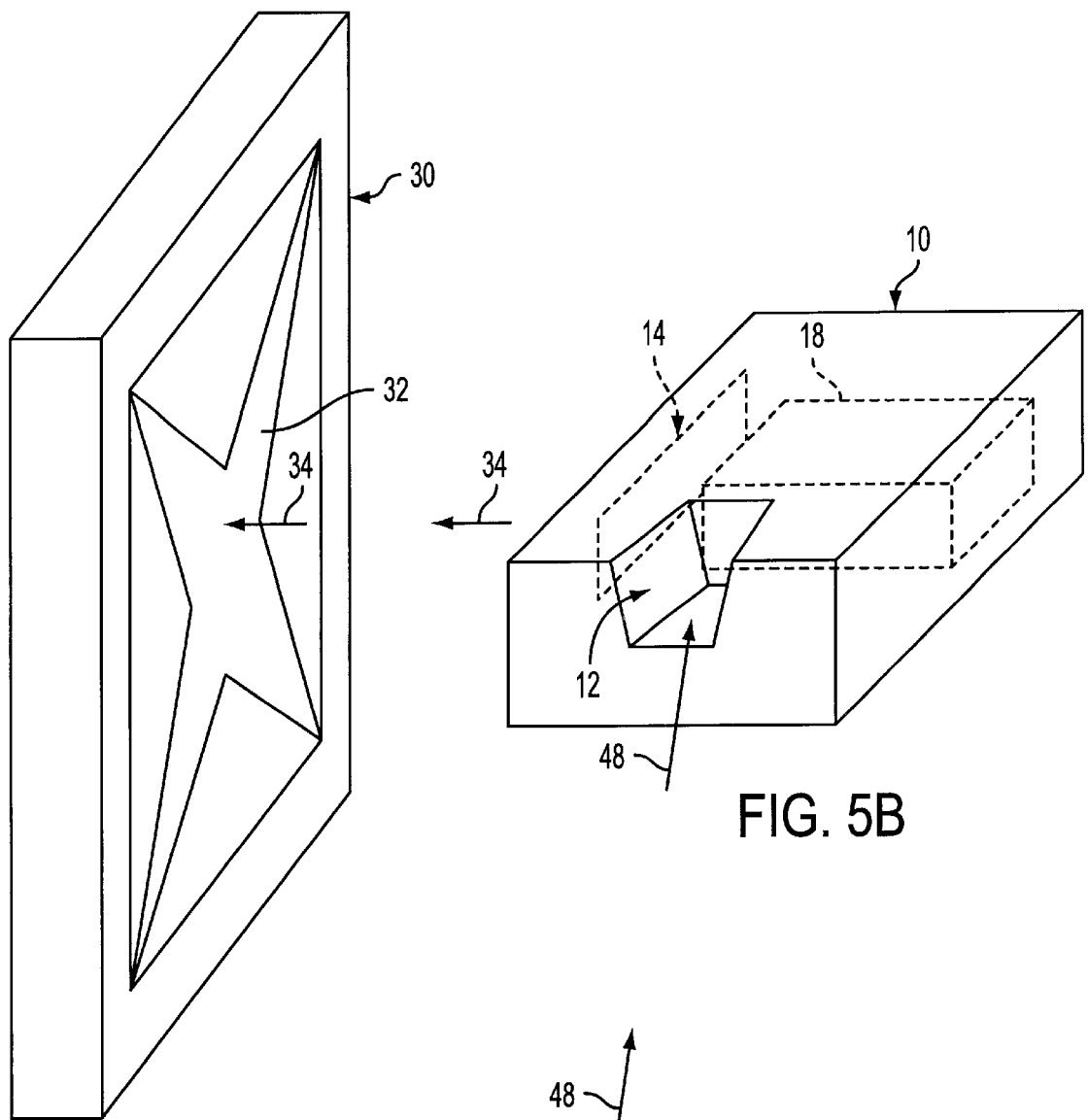
FIG. 5A
FIG. 5B
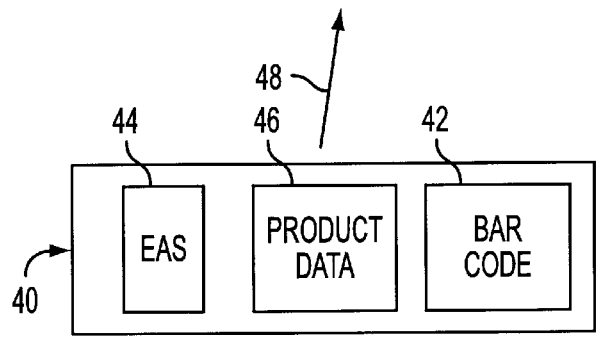
FIG. 5C

RFID READER WITH INTEGRATED DISPLAY FOR USE IN A PRODUCT TAG SYSTEM

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

This invention relates to the fields of product scanning and product tracking, and in particular, to a product tag system integrating an enhanced wireless reader with a bar code scanner.

2. Description of the Related Art

A wireless communication transponder, for example a radio frequency identification (RFID) tag, can provide the ability to store and update information within an internal storage element and can be associated with a product starting at its manufacturing origins. This transponder can be used and reused throughout manufacturing, distribution and the retail processing of the product. These transponders are already provided with EAS elements, and are further able to store encoded bar code information.

At a point of sale (POS), for example, the transponder can be scanned to retrieve the stored information. However, a bar-code scanner can be present, and indeed is likely to be present, which interfaces to the cash register and the retail system. An item or product needs to be scanned by the bar code reader as well, to complete a transaction.

As an alternative, an RFID reader can be interfaced to the cash register, eliminating the bar code scanner interface. This approach lacks practicality because bar code scanning may be necessary on many items that lack RFID tags. Another alternative is to employ both a bar code scanner and an RFID reader. This approach requires cabling software and other changes to accommodate both systems, which makes the hardware more expensive to manufacture and install. Moreover, two operations would then be necessary for each sold product, namely bar code scanning and RFID reading, thus slowing check-out. The detection of an electronic article surveillance (EAS) element is usually implemented at an exit door, and accordingly, this aspect of wireless communication has not before interfered with bar code scanning.

Bar code readers are only capable of providing predefined information according to their predetermined markings, namely bars. EAS protection is provided by a separate tag. Further, an article would need a third tag for RFID functionality. Such a combination can be expected to hinder, rather than promote efficiency for point of sale operations. Any solution must compliment the existing bar code applications and not adversely affect the productivity of the bar code application.

Accordingly, there is a long-felt need to merge the bar code scanning, wireless communication and EAS technologies for the purpose of providing a total solution that integrates bar code scanners with wireless communication and EAS protection.

SUMMARY OF THE INVENTION

The inventive arrangements satisfy the long-felt need for integration by employing a wireless communication system and an EAS device in conjunction with a bar-code scanner to provide complete POS operation. These elements are advantageously integrated into an apparatus that provides EAS protection and RFID functionality for a system already having a bar code reader.

The inventive arrangements provide in a compact form a facility for the interrogation of items employing bar codes, wireless transponders and EAS protection. The design is advantageously compact for applications with limited space and where the bar code scanner is mobile.

The inventive arrangements advantageously facilitate interfacing an RFID reader with a bar-code scanner by using a display. The display conveys the bar code information residing in the RFID component to the bar code reader. This approach minimizes installation requirements and provides RFID functionality to bar code systems. Compatibility between RFID and any bar-code scanner and associated POS station is possible due to the optical bar-code interface to the display, i.e., there are no wired connections.

A product tag system, in accordance with the inventive arrangements, includes: an RFID tag adapted for attachment to a product; at least one data store in the tag for bar code information relating to the product, which is typically a UPC code, but could be other bar coded data; a tag detacher for removing the tag from the product at a point of sale; an RFID tag reader for retrieving the bar code information from the tag when the tag is placed in the tag detacher; and, a display for presenting the bar code information in a form which can be scanned by a conventional bar code scanner. The tag can further include a detectable EAS element.

The tag detacher is advantageously inoperable for detaching the tag until the bar code information has been read, or alternatively, until the tag detacher receives a confirmation signal that the bar code information has been successfully read by the bar code scanner. In this event, the tag detacher can receive a confirmation signal that the bar code information has been successfully read by the bar code scanner, the tag being detached, for example automatically, in response to the confirmation signal.

The tag can advantageously include a further data store for further product information. The further information can be, for example but not limited to, one or more of product price, product size, SKU number, product identity such as model and serial number, manufacture date and location, and the like.

The tag detacher and the RFID tag reader can be integrated in a single housing, the tag detacher and the display can be integrated in a single housing or the tag detacher, the RFID tag reader and the display can be integrated in a single housing. The single housing can be adapted for mounting in a fixed position with respect to the conventional bar code scanner. Alternatively, the display itself can be adapted for mounting in a fixed position with respect to the conventional bar code scanner.

The system can further comprise an RFID writer. In this case, the tag includes a further data store for receiving from the RFID writer information regarding the sale of the product, wherein the product sale information is available for subsequent use.

The system can further include: a hand-held RFID reader adapted for attachment to a hand-held bar code scanner; a display on the hand-held RFID reader, the display being in an aligned position when the reader and the scanner are attached for presenting the bar code information in a form which can be scanned by the hand-held bar code scanner; and, a tag detacher remote from the reader for detaching the tag after the displayed bar code is scanned. The tag detacher can automatically detach the tag responsive to a signal transmitted by the reader.

A method for monitoring products, in accordance with the inventive arrangements, includes the steps of: attaching an RFID tag to a product; writing bar code information onto the tag; retrieving the bar code information from the tag at a point of sale; displaying the bar code information in a form which can be scanned by a conventional bar code scanner at the point of sale; and, detaching the tag from the product. The attaching and writing steps can occur in any order. Moreover, the attaching, writing and activating steps can occur in any order.

The method can further include the step of activating a detectable EAS element in the tag prior to the retrieving step.

The method further includes the step of detaching the tag only after the bar code information has been read by the conventional bar code scanner.

The method can include the step of performing the retrieving, displaying and detaching steps with components disposed in a single housing. In this case, the method can further include the step of disposing the housing in a fixed position relative to the conventional bar code scanner.

The writing step can include also writing onto the tag at least one of: price information, size information, SKU number, manufacture date and location, and the like.

The method can further include the step of writing to the tag, at the point of sale, information regarding the sale of the product, whereby the product sale information is available for subsequent use.

Objectives, advantages, and applications of the present invention will be made apparent by the following detailed description of embodiments of the invention.

BRIEF DESCRIPTION OF THE DRAWINGS

FIGS. 5(a), 5(b) and 5(c) are useful for explaining the interaction of the tag detacher of FIGS. 1–4 with a conventional fixed location bar code scanner in a first orientation and a tag in accordance with the inventive arrangements.

DETAILED DESCRIPTION OF THE PREFERRED EMBODIMENTS

In accordance with the inventive arrangements, an RFID element and an EAS element are combined in a hard tag, which is not a permanent tag on an article, but rather, is removed from the article at the point of sale. One embodiment incorporates but is not limited to a hard tag detacher capable of reading the RFID information. The RFID information can contain information about the article normally contained in a bar code, such as, but not limited to, UPC code, product price, product size, SKU number, product identity such as model and serial number, manufacture date and location, and the like. The apparatus that receives the RFID tag information conveys the bar code information to the bar code reader through a display, for example, but not limited to, a liquid crystal display (LCD) or a programmable ink display. The RFID reader can reside within the detacher or the RFID reader can reside in whole or in part in a separate enclosure.

Figure 1:
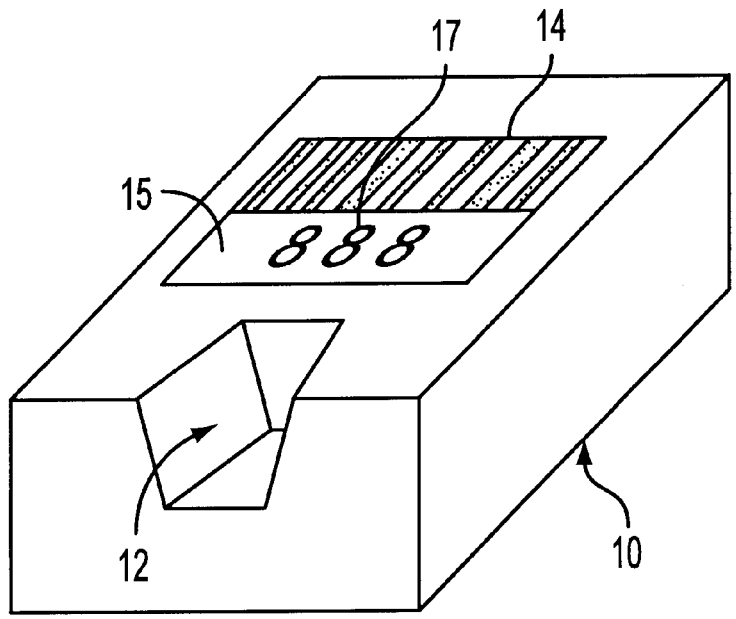
FIG. 1 is a perspective view of a fixed location tag detacher having a display in accordance with an inventive arrangement.
Figure 2:
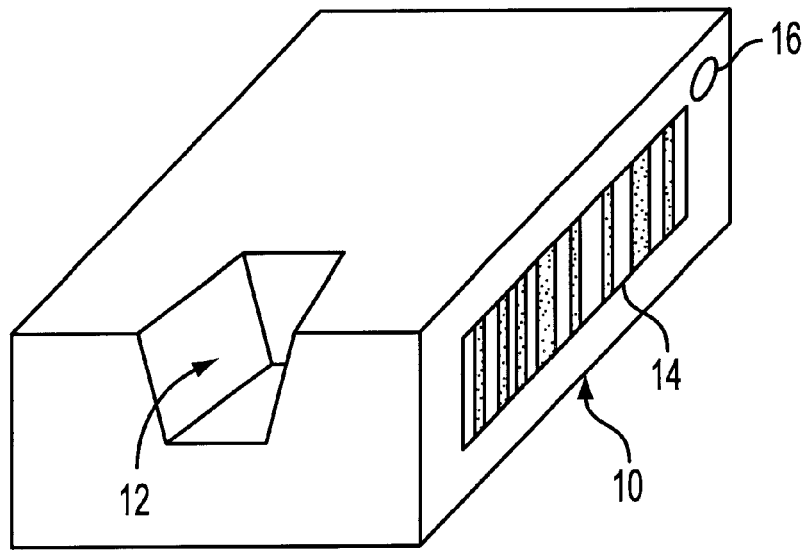
FIG. 2 is a perspective view of the tag detacher of FIG. 1 having the display in a different location.
Figure 3:
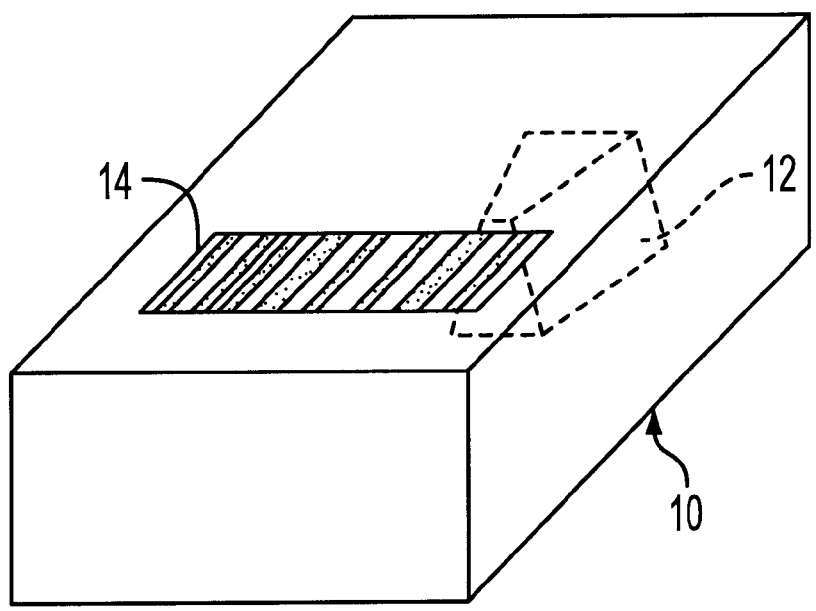
FIG. 3 is a perspective view of the tag detacher of FIGS. 1 and 2, having the display in another location.
Figure 4:
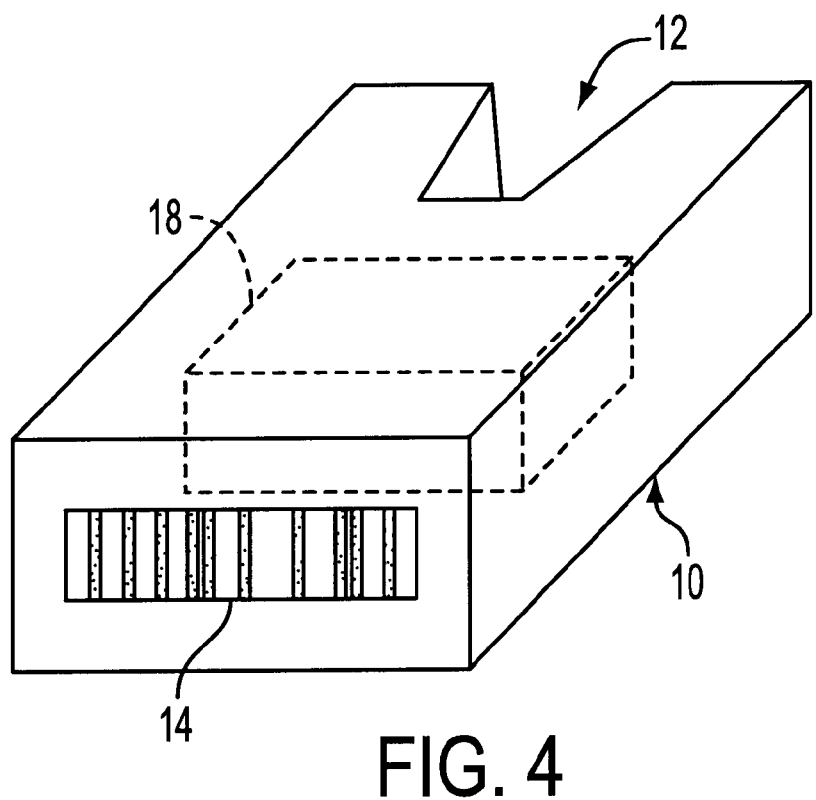
FIG. 4 is a perspective view of the tag detacher of FIGS. 1–3, having the display in yet another location.

Security tag detachers are well known, being used to remove tags with EAS elements, which cannot be deactivated. A tag detacher 10 in accordance with the inventive arrangements is shown in FIG. 1. The tag removal aspect of the tag detacher is well known and need not be described herein. The detacher 10 has an opening 12 into which the locking part of a security tag is inserted, being removed therefrom by operation of the detacher. In accordance with the inventive arrangements, the detacher 10 further comprises a display 14, for example an LCD element or programmable ink display, which is capable of displaying a bar code in such a manner that the displayed bar code can be reliably scanned by a conventional bar code scanner. In FIG. 1, the display 14 is on the top of the detacher, with respect to the orientation of FIG. 1. Other variations of the detacher 10 are shown in FIGS. 2–4. In FIG. 2, the display 14 is on the right side. In FIG. 3, the display 14 is on the bottom. In FIG. 4, the display 14 is on the rear side. Any suitable location for display 14 is acceptable, including remote from detacher 10, depending on the configuration of the bar code reading apparatus and POS station. Display 15 can be included on detacher 10 to include human readable indicia 17, which can include article information such as item and price. Display 15 can be in addition to, in place of, part of, or separate from, display 14, depending upon the application, and can be positioned in any suitable location.

FIG. 4 shows an enclosure 18 within detacher 10. In one embodiment, the enclosure 18 houses an RFID reader or an RFID reader/writer. Such circuits are known in and of themselves, and need not be described in detail. Enclosure 18 has been omitted from FIGS. 1–3 for purposes of clarity. Detacher 10 in FIG. 2 has an sensor 16, for example a photo detector. In accordance with the inventive arrangements, the sensor 16 can receive a signal, for example from a bar code scanner, which confirms that the bar code displayed by the display 14 has been successfully scanned, or successfully scanned and decoded. The detacher can be programmed to be inoperable for detaching a tag until such a signal has been received. In a further aspect of the inventive arrangements, the detacher can automatically detach a tag in response to such a signal. Sensor 16 can be used in each of the detacher configurations shown in FIGS. 1–4, and other configurations.

A complete system is shown in FIGS. 5(a), 5(b) and 5(c). A conventional bar code scanner 30, which can be a slot scanner or handheld scanner, includes an area 32 within the boundaries of which the scanner can detect a bar code. A detacher 10 comprises a display 14 on a side thereof, facing and aligned with the area 32 of the bar code scanner 30, as indicated by arrow 34. The mounting brackets are omitted for purposes of clarity, and in any event, will be different for different point of sale cash register stations and scanner types. The detacher 10 can include an RFID reader or an RFID reader/writer disposed in enclosure 18. An RFID tag 40 can include a bar code data store 42, and active EAS element 44 and a product data store 46. Bar code data store 42 and product data store 46 can be a single data store or can be separate data stores as illustrated. When the tag is placed in the opening 12 of the detacher 10, represented by arrow 48, the RFID reader automatically reads the bar code form the bar code data store 42 and displays the bar code on the display 14, where it is scanned by the bar code scanner 30. The RFID reader can also retrieve product information from the he data store 46 and transmit this information to the cash register or other related device. Finally, the RFID writer can transmit information regarding the sale of the product to the data store 46. As the tag is eventually returned to the manufacturer, the sales information can be read before the tag is recycled.

Figure 6B:
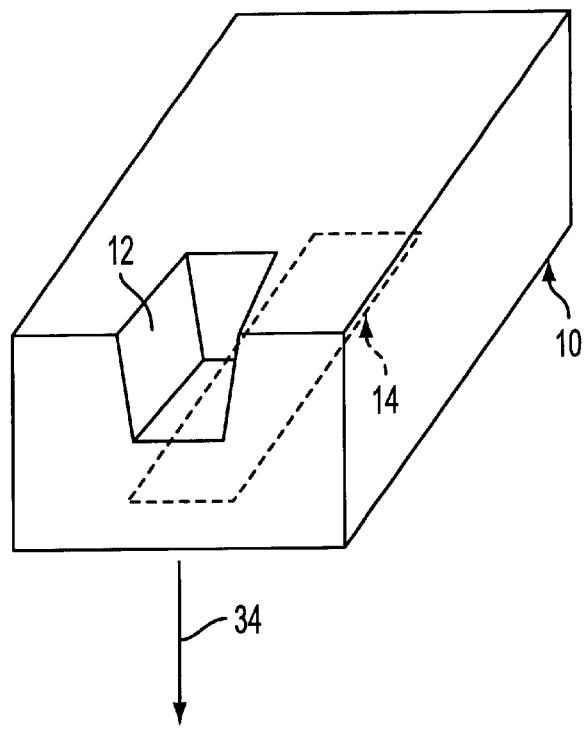
FIGS. 6(a) and 6(b) are useful for explaining the interaction of the tag detacher of FIGS. 1–4 with a conventional fixed location bar code scanner in a second orientation.
Figure 6A:
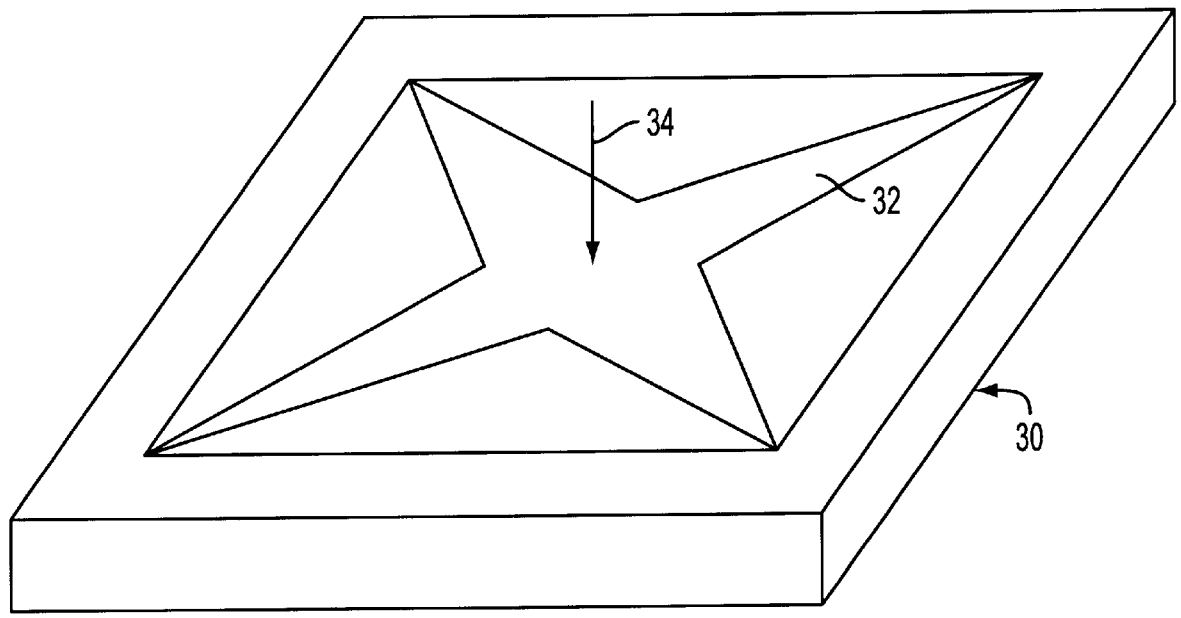

A different orientation is shown in FIGS. 6(a) and 6(b), the tag and the enclosure 18 being omitted for purposes of clarity. The detacher 10 has an display 14 on the bottom surface. The detacher is fixed above the bar code scanner 30, with the display being aligned with area 32, as represented by arrow 34.

Figure 7A:
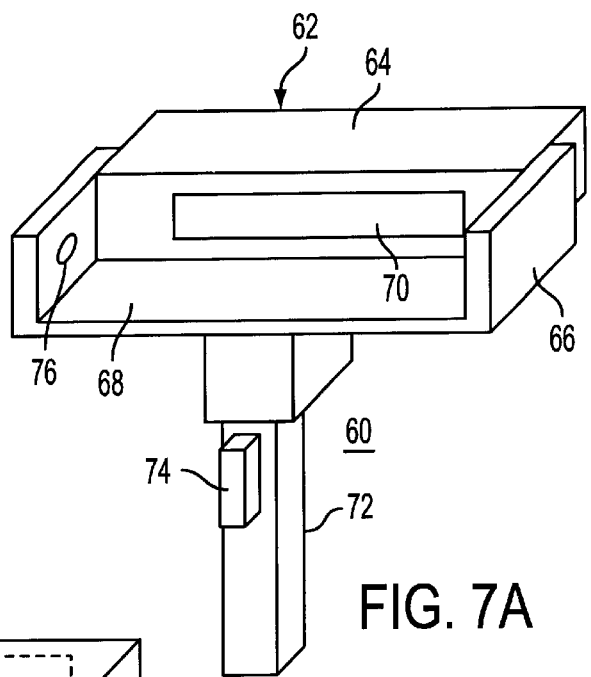
FIGS. 7(a), 7(b) and 7(c) are useful for explaining the interaction of a mobile RFID reader, a mobile bar code scanner and a tag detacher, in accordance with the inventive arrangements.
Figure 7B:
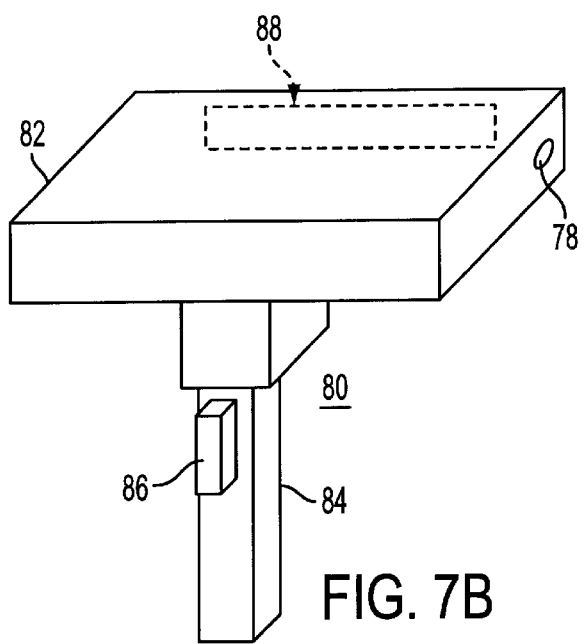
Figure 7C:
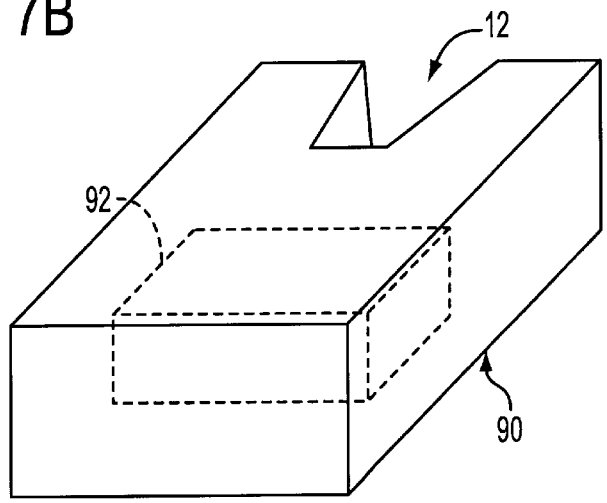

An alternative embodiment is shown in FIGS. 7(a), 7(b) and 7(c). A hand-held bar code scanner 60 has a housing 62 having a bar code scanner unit 64 and an RFID docking unit 66. The scanner unit 64 has a bar code scanning area 70. The housing 62 is supported by a handle 72 having a trigger 74 for activating the scanner. A hand-held RFID reader/writer 80 has a housing 82 having a display 88, corresponding to display 14. The housing is supported by a handle 84 having a trigger 86 for activating the RFID reader. The RFID reader/writer is in wireless communication with a tag detacher 90, having a receiving circuit in enclosure 92. The RFID reader/writer is also in wireless communication with an RFID tag, such as tag 40 in FIG. 5(c). A detent structure having a first part 76 in docking unit 66 and a second part 78 on housing 82, for example disposed in a pair on opposite sides, can be utilized for attaching the RFID reader/writer to the bar code scanner. The trigger 86 can be arranged to operate through handle 84 and engage trigger 74, so that both are active at the same time for reading and scanning the bar code.

Combining the RFID element and the EAS element into a single tag advantageously alleviates point of sale burden due to multiple tags on an article. If the RFID tag contains bar code information, which can be displayed, a separate bar code label is not required. Furthermore, manual retrieval of the bar code information by a bar code scanner is not necessary if the POS system is otherwise capable of communication with the RFID reader through displayed bar code information.

The requirements for cabling and system installation are also advantageously reduced by having an optical interface that scans the displayed bar code information.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A product tag system, comprising:
   an RFID tag adapted for attachment to a product;
   at least one data store in said tag for bar code information relating to said product;
   a tag detacher for removing said tag from said product at a point of sale;
   an RFID tag reader for retrieving said bar code information from said tag when said tag is placed in said tag detacher; and,
   a display for presenting said bar code information in a form which can be scanned by a conventional bar code scanner, said display associated with said tag detacher and said RFID tag reader at said point of sale.

2. The system of claim 1, wherein said tag further comprises a detectable EAS element.

3. The system of claim 1, wherein said tag detacher is inoperable for detaching said tag until said bar code information has been read.

4. The system of claim 1, wherein said tag further comprises a further data store for further product information.

5. The system of claim 1, further including a display for displaying human readable information related to said product.

6. The system of claim 1, wherein said tag detacher is inoperable for detaching said tag until said tag detacher receives a confirmation signal that said bar code information has been successfully read by said bar code scanner.

7. The system of claim 1, wherein said tag detacher comprises means for receiving a confirmation signal that said bar code information has been successfully read by said bar code scanner, said tag being detached responsive to said confirmation signal.

8. The system of claim 1, wherein said tag detacher and said RFID tag reader are integrated in a single housing.

9. The system of claim 1, wherein said tag detacher and said display are integrated in a single housing.

10. The system of claim 9, wherein said single housing is adapted for mounting in a fixed position with respect to said conventional bar code scanner.

11. The system of claim 1, wherein said display and said RFID tag reader are integrated in a single housing.

12. The system of claim 11, wherein said single housing is adapted for mounting in a fixed position with respect to said conventional bar code scanner.

13. The system of claim 11, wherein said single housing is adapted for mounting in a fixed position with respect to said conventional bar code scanner.

14. The system of claim 11, wherein said tag detacher, said RFID tag reader and said display are integrated in a single housing.

15. The system of claim 1, wherein said display is adapted for mounting in a fixed position with respect to said conventional bar code scanner.

16. The system of claim 1, further comprising an RFID writer.

17. The system of claim 16, wherein said tag comprises a further data store for receiving from said RFID writer information regarding said sale of said product, whereby said product sale information is available for subsequent use.

18. A product tag system, comprising:
    an RFID tag adapted for attachment to a product;
    at least one data store in said tag for bar code information relating to said product;
    a tag detacher for removing said tag from said product at a point of sale;
    an RFID tag reader for retrieving said bar code information from said tag when said tag is placed in said tag detacher;
    a display for presenting said bat code information in a form which can be scanned by a conventional bar code scanner;

a hand-held RFID reader adapted for attachment to a hand-held bar code scanner;

a display on said hand-held RFID reader, said display being in an aligned position when said reader and said scanner are attached for presenting said bar code information in a form which can be scanned by said hand-held bar code scanner; and, a tag detacher remote from said reader for detaching said tag after said displayed bar code is scanned.

19. The system of claim 18, wherein said tag detacher automatically detaches said tag responsive to a signal transmitted by said reader.

20. A method for monitoring products, comprising the steps of:

attaching an RFID tag to a product;

writing bar code information onto said tag;

retrieving said bar code information from said tag at a point of sale; and, displaying, at said point of sale, said bar code information in a form which can be scanned by a conventional bar code scanner at said point of sale.

21. The method of claim 20, further comprising the step of activating a detectable EAS element in said tag prior to said retrieving step.

22. The method of claim 21, wherein said attaching, writing and activating steps can occur in any order.

23. The method of claim 20, further comprising the step of detaching said tag from said product.

24. The method of claim 23, comprising the step of performing said retrieving, displaying and detaching steps with components disposed in a single housing.

25. The method of claim 24, comprising the step of disposing said housing in a fixed position relative to said conventional bar code scanner.

26. The method of claim 20, wherein said attaching and writing steps can occur in any order.

27. The method of claim 20, further comprising the step of displaying said bar code information from a position fixed relative to said conventional bar code scanner.

28. The method of claim 20, further comprising displaying said bar code information in human readable form.

29. The method of claim 20, further comprising the step of writing to said tag, at said point of sale, information regarding said sale of said product, whereby said product sale information is available for subsequent use.

* * * * *

UNITED STATES PATENT AND TRADEMARK OFFICE
CERTIFICATE OF CORRECTION

PATENT NO.    : 6,429,776 B1
DATED         : August 6, 2002
INVENTOR(S)   : Alicot et al.

It is certified that error appears in the above-identified patent and that said Letters Patent is hereby corrected as shown below:

<u>Column 6,</u>
Line 43, replace "11" with -- 1 --
Line 65, replace "bat" with -- bar --

Signed and Sealed this

Twenty-eighth Day of January, 2003

JAMES E. ROGAN
*Director of the United States Patent and Trademark Office*